United States Patent [19]

Treiber et al.

[11] Patent Number: 5,765,189
[45] Date of Patent: Jun. 9, 1998

[54] METHOD AND APPARATUS FOR COMPUTER DISK DRIVE BUFFER MANAGEMENT

[75] Inventors: Richard Kent Treiber, San Jose, Calif.; Jonathan Mark Haswell, Harts, Great Britain; Spencer Wah-Fung Ng, San Jose, Calif.; Mario Yamaguchi, Kanagawa-ken, Japan

[73] Assignee: International Business Machines Corporation, Armonk, N.Y.

[21] Appl. No.: 626,100

[22] Filed: Apr. 3, 1996

Related U.S. Application Data

[63] Continuation of Ser. No. 259,531, Jun. 14, 1994, Pat. No. 5,566,317.

[51] Int. Cl.$^6$ ........................................ G06F 12/08
[52] U.S. Cl. ............... 711/117; 711/137; 711/158; 395/859; 395/860
[58] Field of Search ........................ 395/439, 440, 395/444, 445, 464, 485, 250, 872, 859, 860; 711/112, 113, 117, 118, 137, 158

[56] References Cited

U.S. PATENT DOCUMENTS

| | | | |
|---|---|---|---|
| 4,561,051 | 12/1985 | Rodman et al. | 711/152 |
| 4,707,781 | 11/1987 | Sullivan et al. | 395/474 |
| 4,908,825 | 3/1990 | Vea | 395/489 |
| 4,991,080 | 2/1991 | Emma et al. | 395/382 |
| 5,053,945 | 10/1991 | Whisler | 707/200 |
| 5,133,060 | 7/1992 | Weber et al. | 711/113 |
| 5,136,692 | 8/1992 | Barrett et al. | 395/825 |
| 5,146,578 | 9/1992 | Zangenehpour | 711/137 |
| 5,179,679 | 1/1993 | Shoemaker | 711/118 |
| 5,353,426 | 10/1994 | Patel et al. | 711/118 |
| 5,361,391 | 11/1994 | Westberg | 711/137 |
| 5,379,379 | 1/1995 | Becker et al. | 711/158 |
| 5,381,528 | 1/1995 | Brunelle | 395/250 |
| 5,410,653 | 4/1995 | Macon, Jr. et al. | 711/113 |
| 5,434,993 | 7/1995 | Liencres et al. | 711/133 |
| 5,450,564 | 9/1995 | Hassler et al. | 711/158 |
| 5,553,268 | 9/1996 | Willenz et al. | 395/485 |

OTHER PUBLICATIONS

"Shared Cache in a Checkpoint Environment", J.A. Weiss and B.E.Willner, IBM Technical Disclosure Bulletin, vol. 25, No. 11B, Apr. 1983, pp. 5960–5961.

"A System amd Method for Performing a Multi–File Transfer Operation", J. W. Whisler, Patent No. 5,053,945, Appendix pp. 21–118.

Primary Examiner—Eddie P. Chan
Assistant Examiner—Hiep T. Nguyen
Attorney, Agent, or Firm—Baker Maxham Jester & Meador

[57] ABSTRACT

A system manages data transfer between a computer, a data storage disk, and a data buffer which is associated with the disk. Upon receipt of a write request during data read-ahead from the disk to the buffer, the system preempts the read-ahead to write the data to the disk only when the target write track on the disk is different from the track being read ahead into the buffer. Otherwise, the system permits read-ahead to continue until the target write sector is positioned beneath the disk drive head. Also, upon receipt of a read request during cache writing from the buffer to the disk, the system immediately satisfies the read request prior to completing the cache writing when the requested read data is contained in the buffer. Moreover, the system provides for dynamic switching between a data read-ahead preempt policy and a data read-ahead no-preempt policy based upon parallel monitoring and comparison of data request service times under both policies.

22 Claims, 4 Drawing Sheets

METHOD AND APPARATUS FOR COMPUTER DISK DRIVE BUFFER MANAGEMENT

This application is a continuation of application U.S. Ser. No. 08/259,531, filed Jun. 14, 1994, now U.S. Pat. No. 5,566,317.

BACKGROUND OF THE INVENTION

1. Field of the Invention

The present invention relates generally to computer hard disk drives, and more particularly to the management of data transfer to and from computer hard disk drive buffers.

2. Description of the Related Art

Many, if not most, computer disk drives incorporate a solid state data buffer in addition to the main optical or magnetic data storage medium on the disk. Solid state data buffers are used to improve disk performance by increasing the speed with which data is transferred between the disk drive and its host computer.

Typically, the solid state buffer of a computer disk drive is used to improve the disk drive performance in two ways. First, after the disk drive has transferred data from a particular sector of the disk to the host computer in conformance with a request for the data, the drive continues to "read ahead", i.e., copy, data from the disk into the buffer. Specifically, the drive copies data into the buffer from sectors on the disk that are adjacent to the sector from which the read data had been extracted. This makes sense with modern computer architectures, wherein a strong likelihood exists that subsequent requests for data will require data from disk sectors adjacent the sector which was used to service the original request.

If indeed a subsequent request for data in one of the adjacent disk sectors is received, the request can be satisfied much more quickly by transferring the data from the solid state buffer to the computer, instead of from the disk itself to the computer. In large part, this is because data transfer between a disk and a computer usually requires the mechanical repositioning of one or more disk drive components, whereas data transfer between a solid state data buffer and the computer requires no such mechanical operations.

Of course, a subsequent request for data may be made which does not require data that has been read-ahead into the buffer. When this occurs, the read-ahead operation can be preempted by the disk drive in favor of immediately servicing the data request from the disk. Such an operation, undertaken pursuant to what is familiarly referred to as a "preempt policy", may make sense because no guarantee exists that subsequent requests for data can indeed be satisfied from the buffer. Stated differently, the disk drive can preempt buffer read-ahead and thereby sacrifice response time for servicing a future request in order to immediately service a current request from the disk.

Alternatively, the disk drive can employ a so-called "no-preempt" policy in which the read-ahead operation is allowed to continue in the presence of a request for disk data. A no-preempt policy makes sense when it is advantageous to delay servicing the current request for data to improve the response time of the disk drive for potential future requests for data. In either case, it is clear that a trade-off exists in selecting whether to preempt data read-ahead into a solid state buffer.

The best policy depends upon the workload and becomes more important as the request rate increases. Unfortunately, once established, the preemption policy of choice is not ordinarily changed. Consequently, for example, a read-ahead "preempt" policy selected on the basis of an expected low data request rate is ineffective in increasing disk drive response time when the data request rate suddenly increases. Under such circumstances, the disk drive policy of "preempt" results in interrupting buffer read-ahead precisely when read-ahead is most desirable.

In addition to data read-ahead, a second way in which solid state data buffers improve disk drive performance is by temporarily "caching", i.e., storing, computer data that is intended to be "written", i.e., stored, on the disk. More particularly, the buffer receives the data from the computer and stores the data until appropriate mechanical repositioning of disk drive components is effected to support writing the data onto the disk. Once the components have been repositioned, the data is written from the buffer to the disk.

Importantly, however, the disk drive does not wait until the data has been written to the disk to report to the computer that the data write has been completed. Instead, the disk drive reports completion of the data write immediately upon receipt of the data in the buffer, thereby greatly improving the response time of the disk drive.

Like computer read requests, computer write requests can give rise to situations wherein it is desirable to preempt certain operations in favor of other operations. For example, it is typically the case that upon receipt of write request data into the buffer for subsequent transfer to the disk, data read-ahead from the disk to the buffer will be preempted to immediately complete the write request. As discussed above, however, preemption of data read-ahead is not without its potential future costs.

Similarly, upon receipt of a read request during a buffer-to-disk write operation, the read request will be delayed until completion of the write operation. By delaying servicing of the read request until the completion of the write operation, repeated interruptions of disk operations and, hence, repeated, time-consuming repositioning of the input/output components of the disk drive is avoided. Nevertheless, servicing of the read request is unfortunately delayed as a result.

As recognized by the present invention, however, it is possible to alleviate the above-discussed problems. Accordingly, it is an object of the present invention to provide a computer disk drive system with buffer wherein the preemption policy of data read-ahead into the buffer is selectively established. Another object of the present invention is to provide a computer disk drive system with buffer wherein a read request from the computer can be satisfied during a buffer-to-disk write operation. Still another object of the present invention is to provide a computer disk drive system with buffer wherein data read-ahead into the buffer can continue in the presence of a write request from the computer. Yet another object of the present invention is to provide a computer disk drive system with buffer which is easy to use and cost-effective.

SUMMARY OF THE INVENTION

A system selectively establishes a data read ahead preempt policy in a computer disk drive which has a data buffer. The system includes a preempt policy controller for receiving a data request from a user and generating a first signal in response to the request. Also, the system includes a no-preempt policy controller for receiving the data request from a user and generating a second signal in response to the request.

A preempt timer receives the first signal and determines a first service time period in response, while a no-preempt timer receives the second signal and determines a second service time period in response. Then, a comparator generates a differential signal representative of the difference between the first and second service time periods, and a switch determines whether to preempt data read ahead into the buffer in response to the differential signal from the comparator.

Preferably, the system also includes a data request counter for determining the number of data requests received from the user. As intended by the present invention, the comparator generates the differential signal when the data request counter determines that the number of data requests equals a predetermined number. Moreover, the switch determines whether to preempt data read ahead into the buffer when the magnitude of the differential signal equals a predetermined magnitude.

In another aspect of the present invention, a method selectively establishes a data read ahead preempt policy in a computer disk drive that has a data buffer into which data from the disk drive can be read ahead of requests for the data. The method includes the steps of receiving a plurality of data requests from a user and, in response to each data request, determining preempt and no-preempt service time periods for satisfying the data request when the reading ahead of data into the buffer is preempted and is not preempted, respectively. Then, the method determines whether to preempt data read ahead into the buffer based upon the aggregate difference between the preempt and no-preempt service time periods.

In still another aspect of the present invention, a system is disclosed for managing data transfer between a computer data storage medium, a data buffer associated with the medium, and an output device for receiving data from the medium and the data buffer. The system includes a read receiver for receiving a request from the output device to transmit read data to the output device. Additionally, the system includes a write receiver associated with the data buffer for receiving write data from the output device and for transmitting the write data to the data storage medium. Moreover, the system includes a switch for selectively transmitting the read data to the output device prior to transmitting the write data from the buffer to the data storage medium based upon whether the read data is contained in the buffer.

In yet another aspect of the present invention, a method is disclosed for managing data transfer between a computer data storage medium, a data buffer that is associated with the medium, and an output device for receiving data from the medium and the data buffer. In accordance with the present invention, the method includes receiving write data from the output device for transmitting the write data to the data storage medium, and receiving a request from the output device to transmit read data to the output device. Then if the read data is contained in the buffer, the read data is transmitted to the output device prior to completely transmitting the write data from the buffer to the data storage medium.

In another aspect of the present invention, a system is disclosed for managing data transfer between a computer data storage medium, a data buffer associated with the medium, and an output device for receiving data from the medium and the data buffer. The system includes read ahead means for reading data from the data storage medium into the buffer prior to requests for the data, and write means for writing data from the output device onto a predetermined data track in the storage medium. Further, the system includes determining means for determining whether the read ahead means is reading data from the predetermined track, and continuing means which are responsive to the determining means for permitting the read ahead means to continue to read data from the data storage medium when the data being read is contained in the predetermined track. Preferably, a disk drive controller incorporates each of the means discussed above, each of which can be established by appropriate hardware, firmware, or software structures.

Additionally, the disk drive controller includes preempting means for causing the read ahead means to terminate reading data into the buffer. The preempting means causes the write means to write data from the output device onto the predetermined data track in the storage medium when the read ahead means is reading data from other than the predetermined track.

In yet another aspect of the present invention, a method is disclosed for managing data transfer between a computer data storage medium, a data buffer associated with the medium, and an output device for receiving data from the medium and the data buffer. The method includes reading data from the data storage medium into the buffer prior to requests for the data, and receiving requests to write data from the output device onto a predetermined data track in the storage medium. Also, the method determines whether the data being read ahead is on the predetermined track, and if so, the method continues to read data from the data storage medium.

In another aspect of the present invention, a system is disclosed for selectively permitting data transfer in a disk drive data buffer in a disk drive having an electronic status. The system includes means for receiving a signal which is representative of the electronic status of the disk drive, and means for establishing data transfer in the data buffer in response to the signal.

In still another aspect of the present invention, a method for selectively permitting data transfer in a disk drive data buffer in a disk drive having an electronic status includes the steps of receiving a signal representative of the electronic status of the disk drive, and establishing data transfer in the data buffer in response to the signal.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
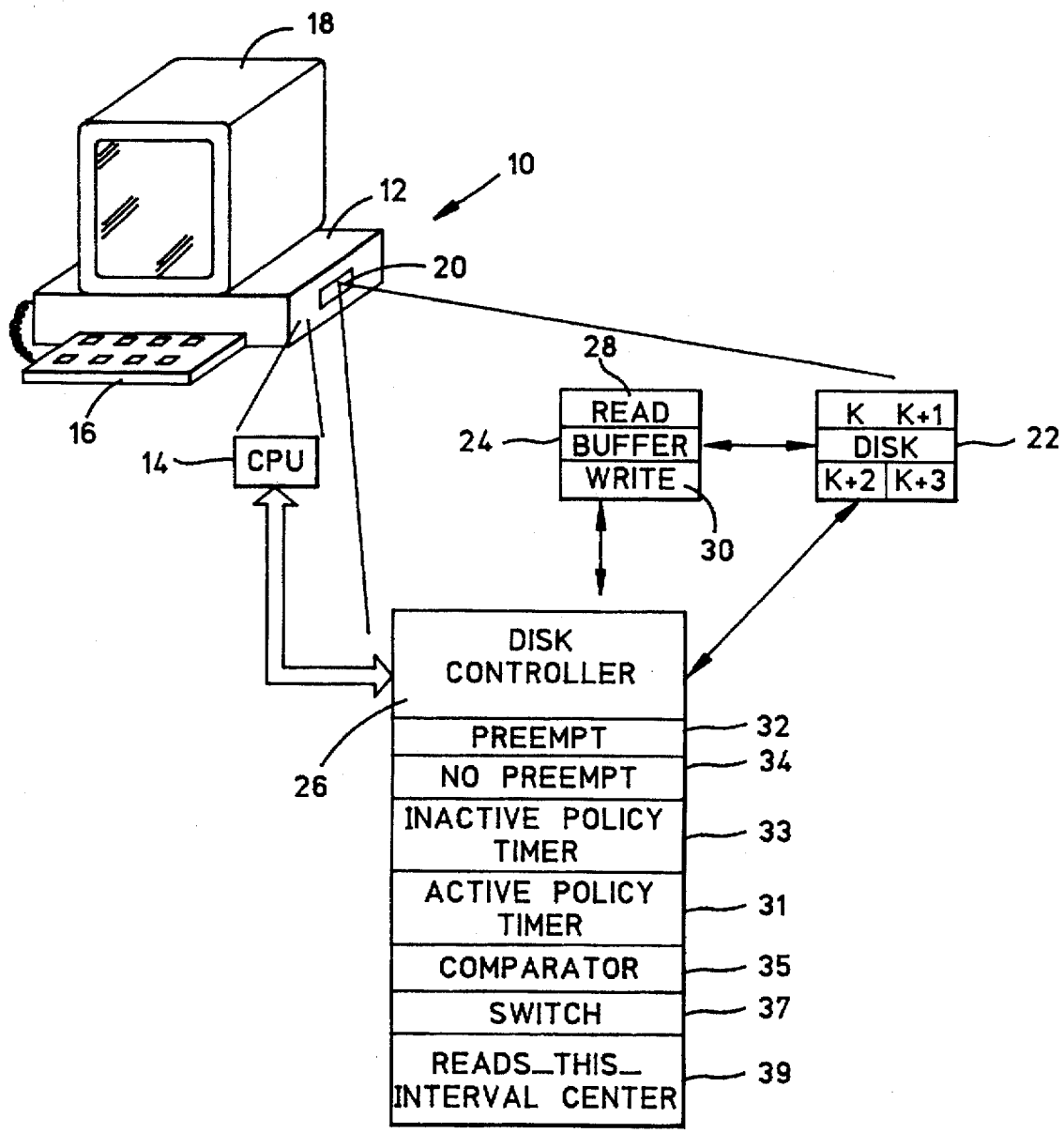
FIG. 1 is a schematic view of the computer disk drive buffer management system of the present invention.

Referring initially to FIG. 1, a system, generally designated 10, is shown for managing data transfer in a computer 12 that has a central processing unit (CPU) 14. In one presently preferred embodiment, the computer 12 is an IBM personal computer.

As shown, the computer 12 includes peripheral computer components, including an input/output (I/O) device 16, e.g., a computer keyboard. Also, the computer 12 is associated with a video monitor 18. Further, the computer 12 includes a computer electronic data storage medium, for example, a hard disk drive 20 that has a rotatable optical or magnetic disk 22 and a solid state data buffer 24. Moreover, the disk drive 20 includes a disk drive controller 26 for controlling the transfer of data between the CPU 14, disk 22, and buffer 24. The CPU 14, I/O device 16, and monitor 18 are electrically connected, and the CPU 14 and disk controller 26 are electrically connected. Also, the disk 22, data buffer 24, and disk controller 26 are electrically connected. In one aspect, the CPU 14 is an I/O device for the disk drive 20.

As indicated in FIG. 1, the disk 22 has a plurality of data storage sectors k, k+1, . . . In accordance with principles well-known in the art, each storage sector k is a segment of one of the many concentric data tracks of the disk 22. As intended by the present invention, the sector k+1 is between the sectors k and k+2, the sector k+2 is between the sectors k+1 and k+3, and so on.

FIG. 1 also indicates that the data buffer 24 includes a read area 28 and a write area 30. As is common in the art, data from the disk 22 which may be requested by the CPU 14 is read into the read area 28 of the buffer 24, while data from the CPU 14 that is to be copied, i.e., written, onto the disk 22 can first be received, i.e., cached, into the write area 30 of the buffer 24 for subsequent transfer to the disk 22.

In accordance with principles well-known in the art, data transfer between the CPU 14 and the disk 22 and buffer 24 is controlled by the disk drive controller 26. Among other things, the disk drive controller 26 can cause data from the disk 22 to be read into the read area 28 of the buffer 24 ahead of requests for the data from the CPU 14 in a so-called "read-ahead" operation.

As envisioned by the present invention, the disk drive controller 26 can selectively preempt, i.e., interrupt, data read-ahead into the buffer 24. Accordingly, the disk drive controller 26 includes a preempt policy controller 32 for causing preemption of data read-ahead into the buffer 24 when, e.g., a request for data contained only on the disk 22 is received. Additionally, the disk drive controller 26 includes a no-preempt policy controller 34 for preventing preemption of data read-ahead into the buffer 24 under the same circumstances in which preemption would otherwise be permitted by the preempt policy controller 32. Both the preempt policy controller 32 and no-preempt policy controller 34 are typically embodied in firmware or software within the disk drive controller 26.

In accordance with the discussion below, the disk drive controller 26 can dynamically shift preempt policies, i.e., the disk drive controller 26 can selectively invoke either a preempt policy or a no-preempt policy for data read-ahead into the buffer 24. Also, the disk drive controller 26 can cause the write area 30 of the buffer 24 to write cached data onto the disk 22 while simultaneously permitting a request for data from the CPU 14 to be serviced when the requested data is contained in the read area 28 of the buffer 24. Furthermore, in the presence of a requirement to write data which is cached in the write area 30 of the buffer 24 onto the disk 22, the disk controller 26 can selectively permit read-ahead of data from the disk 22 into the read area 28 of the buffer 24 to continue, without delaying the cached write.

Figure 2:
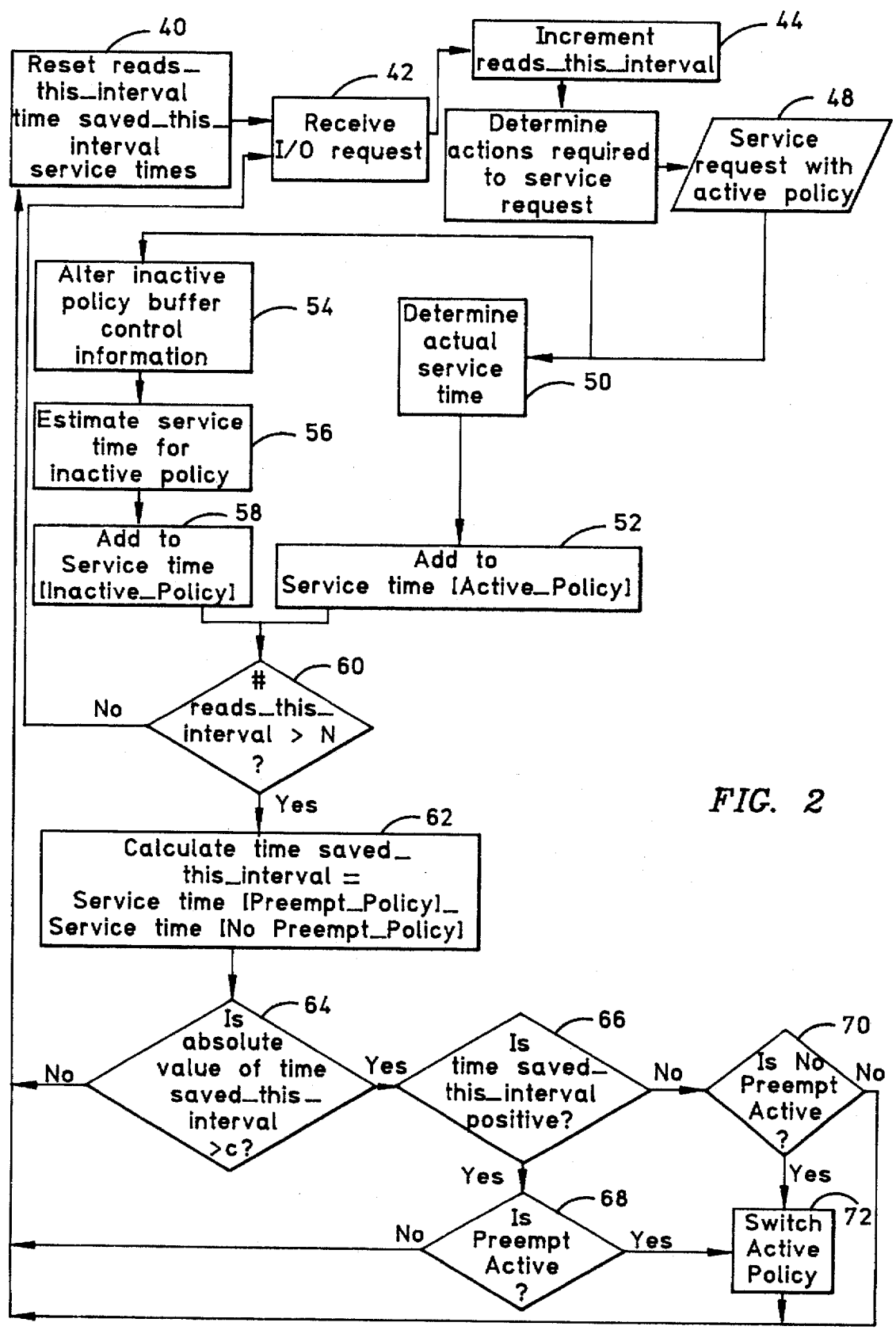
FIG. 2 is a flow chart of the dynamic preemption policy controller of the present invention.

Now referring to FIG. 2, the details of the dynamic preemption policy selection of the disk drive controller 26 can be seen. Initially, either one of the policy controllers 32, 34 is activated, and as shown in block 40, the disk controller 26 resets to zero certain process counters referred to herein as reads_this_interval, timesaved_this_interval, and servicetimes. Then, the process proceeds to block 42, wherein an I/O request is received from the CPU 14. From block 42, the process proceeds to block 44, wherein the counter reads_this_interval is incremented by one.

Next, the process proceeds to block 46, wherein the disk controller 26 determines the actions of the disk drive 20 that are necessary to service the I/O request. From block 46, the process proceeds to output block 48 to service the request by appropriately transferring data between the disk 22 and/or buffer 24 and the CPU 14.

From output block 48, the process proceeds to block 50 to determine the processing time required to service the I/O request discussed above. In other words, at block 50, the active policy controller 32, 34 determines the actual processing time required by it to service the I/O request of the CPU 14. Then, from block 50, the active policy controller proceeds to block 52 to add the time determined in block 50 to the counter servicetime[active_policy]. Thus, blocks 50, 52 essentially establish an active policy timer.

It is to be understood that in determining the processing time at block 50, the active policy controller 32, 34 uses known methods for measuring processing time. For example, the active policy controller 32, 34 determines the time to process the I/O request, mechanically reposition as appropriate the components associated with data transfer to and from the disk 22 in accordance with the active policy, and then complete the I/O operation. On the other hand, when the I/O request can be satisfied using the buffer 24, the active policy controller 32, 34 determines the time for servicing the request without considering the time required for mechanically repositioning components of the disk drive 20. Stated differently, the active policy controller 32, 34 measures the time for servicing the request with the actual processing and structural data transfer characteristics of the disk drive 20 under the active policy.

FIG. 2 also shows that from output block 48, the process moves to block 54, wherein the inactive policy controller 34, 32 alters its buffer control information as though the inactive policy were invoked. More specifically, at block 54 the inactive policy controller 34, 32 simulates processing the I/O request in accordance with the inactive policy, simulates mechanically repositioning as appropriate the components associated with data transfer to and from the disk 22 in accordance with the inactive policy, and then simulates completing the I/O operation in accordance with the inactive policy. Thus, at block 54 the inactive policy controller 34, 32 records the software and hardware configuration of the disk drive 20 were the inactive policy invoked.

Then, at block 56, the inactive policy controller 34, 32 estimates the service time associated with the simulated actions in block 54, using the processing and structural data transfer characteristics of the disk drive 20 under the inactive policy. At block 58, the inactive policy controller 34, 32 adds the time determined in block 56 to the counter servicetime[inactive_policy]. Thus, blocks 54, 56, 58 essentially establish an inactive policy timer.

From blocks 52 and 58, the process moves to decision block 60, wherein it is determined whether the count of reads_this_interval exceeds a predetermined count "N". In one presently preferred embodiment, "N" equals one hundred (100). If the count of reads_this_interval does not exceed "N", the process returns to block 42. Otherwise, the process proceeds to block 62.

At block 62, the disk controller 26 determines a value for timesaved_this_interval by subtracting servicetime [Nopreempt_policy] from servicetime[preempt_policy]. Accordingly, block 62 is essentially a comparator which generates a signal that is representative of the difference between servicetime[preempt_policy] and servicetime [Nopreempt_policy]. The skilled artisan will recognize that servicetime[Nopreempt_policy] and servicetime[preempt_policy] are the servicetime counters determined in blocks 52 and 58, as appropriate for which preemption policy is active and which is inactive.

The process next moves to decision block 64, wherein it is determined whether the magnitude, i.e., the absolute value, of timesaved_this_interval exceeds a predetermined value "C". By ensuring that the absolute value of timesaved_this_interval exceeds the predetermined value "C" as a condition to changing which preemption policy is active, the present invention avoids a change of policy for the sake of insignificant gains in response time. In one presently preferred embodiment, "C" equals 100 microseconds.

If the absolute value of timesaved_this_interval does not exceed "C", the process returns to block 40. Otherwise, the process proceeds to decision block 66, wherein it is determined whether timesaved_this_interval is positive. If not, the process moves to decision block 70, wherein it is determined whether the no-preempt policy is the active policy. Otherwise, the process moves to decisions block 68, wherein it is determined whether the preempt policy is the active policy.

If the determination made at decision block 68 or at decision block 70 is negative, the process returns to block 40. On the other hand, if the determination made at decision block 68 or at decision block 70 is positive, the process moves to block 72, wherein the inactive preemption policy is activated and the active preemption policy is deactivated. Accordingly, blocks 64–72 essentially establish a switch for determining whether to preempt the reading ahead of data from the disk 22 into the buffer 24 in response to the determination made at block 62. From block 72 the process returns to block 40.

Figure 3:
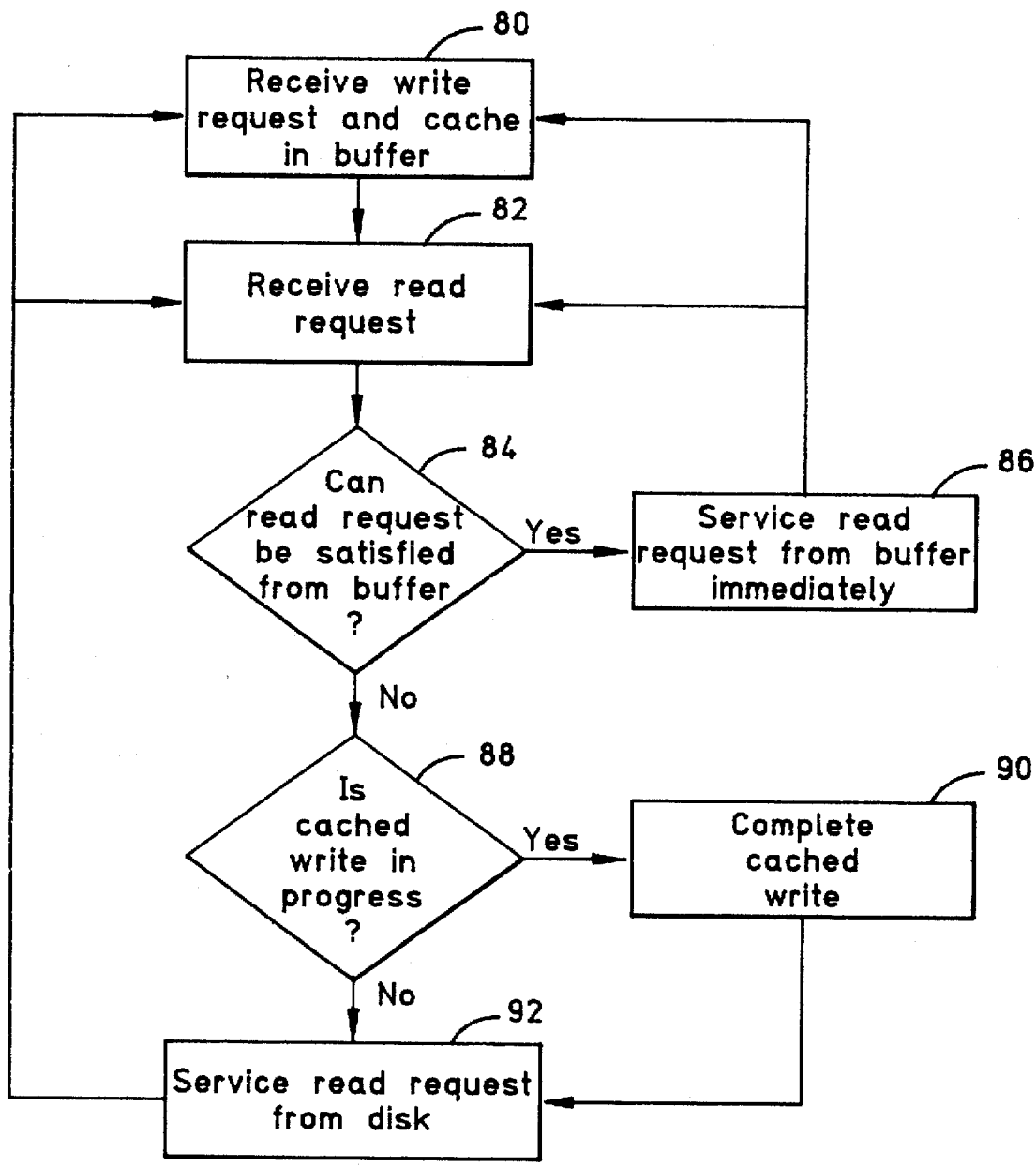
FIG. 3 is a flow chart of the system of the present invention for permitting concurrent read during cached write.

Now referring to FIG. 3, a means is shown for selectively transmitting read data in the buffer 24 to the CPU 14 prior to completing the transmission of write data from the buffer 24 to the disk 22. At block 80, a request from the CPU 14 is received by the disk drive controller 26 to write data from the CPU 14 onto the disk 22. As indicated at block 80, the data to be written onto the disk 22 is cached in the buffer 24. In other words, block 80 is a receiver for receiving a request from the CPU 14 to transmit data from the CPU 14 to the disk 22.

Next, while the write data is cached in the buffer 24 pending mechanical repositioning of the appropriate components of the disk drive controller 26 to write the data onto the disk 22, a read request is received from the CPU 14 at block 82. In other words, block 82 is a receiver for receiving a request from the CPU 14 to transmit data from the disk drive 20 to the CPU 14.

At decision block 84, the disk drive controller 26 determines whether the data requested by the CPU 14 is contained in the buffer 24. If it is, the disk drive controller 26 immediately services the read request from the CPU 14 by immediately transmitting the data from the buffer 24 to the CPU 14 at block 86. From block 86, the disk drive controller 26 returns to block 80 or 82 as appropriate for the next request from the CPU 14.

If, on the other hand, the disk drive controller 26 at decision block 84 determines that the data requested by the CPU 14 is not contained in the buffer 24, the disk drive controller 26 moves to decision block 88 and determines whether a cached write is in progress. If it is, the cached write is completed at block 90, then the read request from the CPU 14 is serviced at block 92 by transmitting the requested read data from the disk 22 to the CPU 14. Otherwise, the read request from the CPU 14 is serviced at block 92 by transmitting the data from the disk 22 to the CPU 14. From block 92, the process returns to block 80 or 82 as appropriate for the next request from the CPU 14. It accordingly will be appreciated that block 84 establishes a switch for selectively transmitting requested read data from the disk drive 20 to the CPU 14 while the cached while is being executed.

With the above disclosure in mind, the gain in response time resulting from the process shown in FIG. 3 can be appreciated. Assuming that the data sectors K+1, K+2, K+3, ... of the disk 22 shown in FIG. 1 have been read ahead into the buffer 24, a series of alternating read/write requests for data on the disk 22 would ordinarily entail one revolution of the disk 22 per read/write pair. This is because it is typically assumed that a read request must be serviced from the disk 22, and consequently a read request ordinarily is not serviced until after an existing cached write has been completed. Thereby, repeated mechanical repositionings of certain components of the disk drive 20 pursuant to servicing a single read/write request pair is avoided. As a consequence of completing the write request prior to servicing the read request from the disk 22, however, the servicing of the read request is delayed up to a full revolution of the disk 22.

In contrast, with the invention disclosed in FIG. 3, a read request for data that happens to have been read-ahead into the buffer 24 is serviced immediately, while the target write sector of the disk 22 moves into position to complete the cached write. Indeed, a plurality of read requests can be serviced immediately from the buffer 24, and a plurality of write requests cached in the buffer 24, during a signal revolution of the disk 22. As the appropriate target sectors of the disk 22 move into position, the cached writes are completed. Accordingly, in about two revolutions of the disk 22, as many read/write pairs as there are sectors on a track of the disk 22 can be completed.

Figure 4:
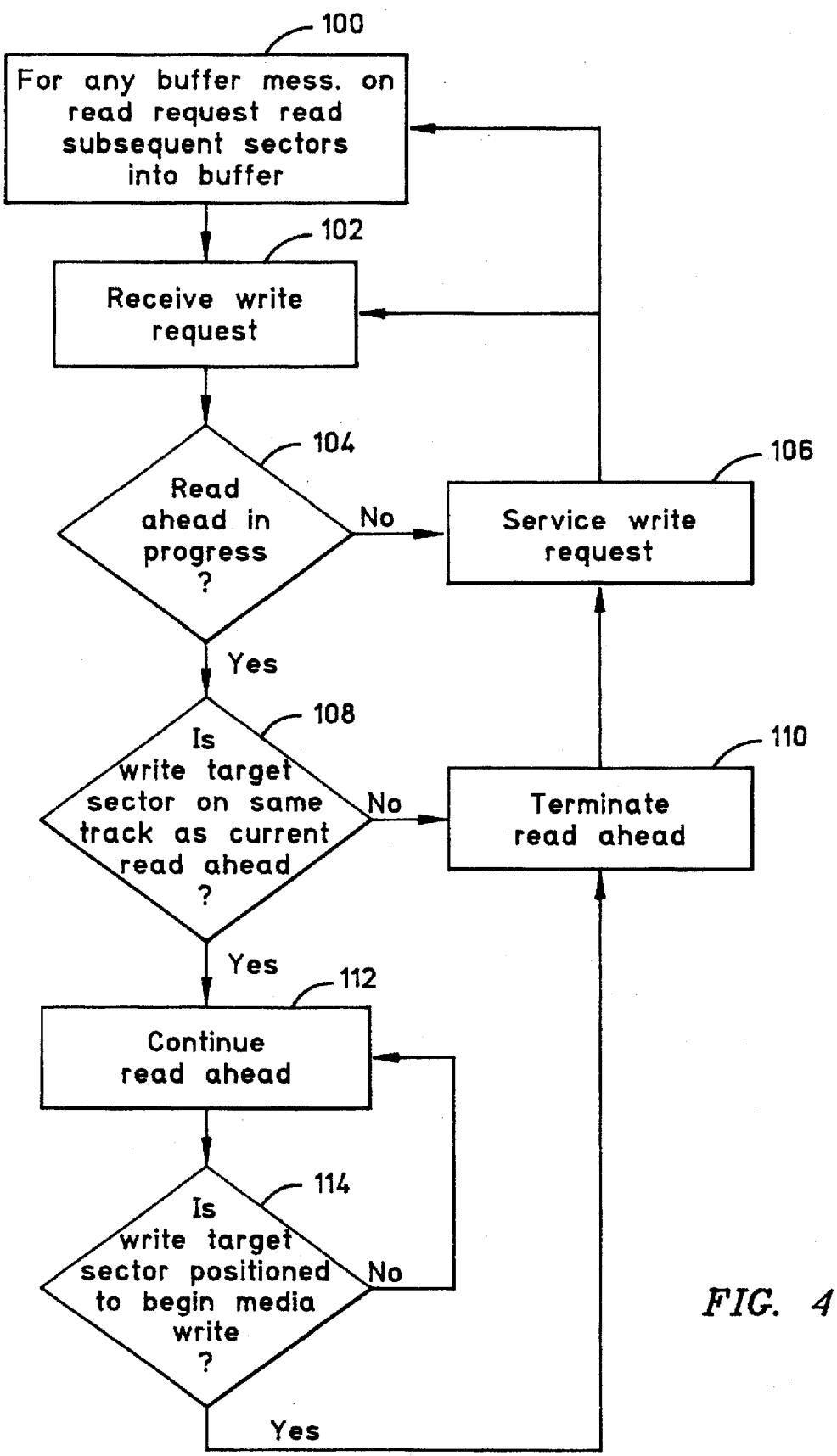
FIG. 4 is a flow chart showing the system of the present invention for permitting buffer read-ahead in the presence of a write command.

FIG. 4 shows a means for permitting data read-ahead from the disk 22 to the buffer 24 to continue in the presence of a cached write. As indicated at block 100, reading-ahead of data from the disk 22 to the buffer 24 is effected upon the failure of the disk drive controller 26 to service a read request from the CPU 14 using data in the buffer 24. Next, at block 102 a request from the CPU 14 is received to write data onto the disk 22. Such a request would typically entail preempting the read-ahead operation commenced at block 100. As shown in FIG. 4 and discussed below, however, the read-ahead commenced at block 100 is not necessarily preempted.

As shown at decision block 104, the present invention determines whether a read-ahead operation is in progress. If it is not, then the disk drive controller 26 moves to block 106 to service the write request and then return to block 100 or 102 as appropriate. Otherwise, the disk drive controller 26 moves to decision block 108, wherein the controller 26 determines whether the track of the target sector of the disk 22 onto which the controller 26 has decided to write the data is the same track which contains data currently being read ahead into the buffer 24.

If the determination at block 108 is negative, the disk drive controller 26 moves to block 110 to terminate the read-ahead, and then to service the write request at block 106. On the other hand, if the determination at block 108 is positive, the disk drive controller 26 moves to block 112 to continue the read-ahead.

From block 112, the controller 26 periodically moves to decision block 114 to determine whether the target write sector of the disk 22 is in position to complete the cached write from the buffer 24. If it is not, the controller 26 loops back to block 112 and continues the read-ahead operation. Once the target write sector is in position to complete the cached write, however, the controller 26 moves to block 110 to terminate the read-ahead and then to block 106 to complete the cached write.

Accordingly, the controller 26 preempts read-ahead operations in the presence of a cached write only when the write data is to be written on a track on the disk 22 that is different from the track from which data read-ahead in being conducted. Consequently, data read-ahead is permitted to continue under certain circumstances, thereby effecting increased efficiency of the disk drive 20 under circumstances that would otherwise require the preempting of desirable data read-ahead operations. Thereby, future read requests from the CPU 14 potentially can be more likely serviced from the buffer 24 instead of the disk 22, greatly improving the response time of the disk drive 20.

While the particular method and apparatus for computer hard disk drive management as herein shown and described in detail is fully capable of achieving the above-stated objects of the invention, it is to be understood that it is illustrative of but one preferred embodiment, that other embodiments may exist that will be obvious to those skilled in the art, and that the scope of the present invention accordingly is to be limited by nothing other the appended claims.

We claim:

1. A system for managing data transfer between a computer data storage medium, a data buffer associated with the medium, and an output device for receiving data from the medium and the data buffer, comprising:
   a read receiver for receiving a request from the output device to transmit read data to the output device;
   a write receiver associated with the data buffer for receiving write data from the output device and for transmitting the write data to the data storage medium;
   a switch for transmitting the read data to the output device prior to transmitting the write data from the buffer to the data storage medium when the read data is contained in the buffer;
   read ahead means for reading data from the medium into the buffer prior to requests for the data;
   write means for writing data from the output device onto a predetermined data track in the storage medium;
   determining means for determining whether the read ahead means is reading data from the predetermined track; and
   continuing means responsive to the determining means for permitting the read ahead means to continue to read data from the data storage medium when the data being read is contained in the predetermined track.

2. The system of claim 1, further comprising preempting means for causing the read ahead means to terminate reading data into the buffer and for causing the write means to write data from the output device onto the predetermined data track in the storage medium when the read ahead means is reading data from other than the predetermined track.

3. The system of claim 2, wherein the write means writes data onto the predetermined data track in a predetermined sector of the storage medium, and the preempting means causes the read ahead means to terminate reading data into the buffer and causes the write means to write data onto the predetermined data track when the predetermined sector is juxtaposed with the write means.

4. The system of claim 1, wherein the switch transmits the write data from the buffer to the data storage medium and then transmits the read data from the data storage medium to the output device when the read data is not contained in the buffer.

5. A data buffer management system, comprising:
   a computer including:
      a data storage medium,
      a data buffer,
      an output device for receiving data from the medium and the data buffer;
      a read receiver for receiving a request from the output device to transmit read data to the output device;
      a write receiver associated with the data buffer for receiving write data from the output device for transmitting the write data to the data storage medium;
      a switch for:
         transmitting the read data to the output device prior to completing the transmission of the write data from the buffer to the data storage medium when the read data is contained in the buffer; and,
         transmitting the write data from the buffer to the data storage medium and then transmitting the read data from the data storage medium to the output device, when the read data is not contained in the buffer;
      read ahead means for reading data from the medium into the buffer prior to requests for the data;
      write means for writing data from the output device onto a predetermined data track in the storage medium;
      determining means for determining whether the read ahead means is reading data from the predetermined track; and
      continuing means responsive to the determining means for permitting the read ahead means to continue to read data from the data storage medium when the data being read is contained in the predetermined track.

6. The system of claim 5, further comprising preempting means for causing the read ahead means to terminate reading data into the buffer and for causing the write means to write data from the output device onto the predetermined data track in the storage medium when the read ahead means is reading data from other than the predetermined track.

7. The system of claim 6, wherein the write means writes data onto the predetermined data track in a predetermined sector of the storage medium, and the preempting means causes the read ahead means to terminate reading data into the buffer and causes the write means to write data onto the predetermined data track when the predetermined sector is juxtaposed with the write means.

8. A method for managing data transfer between a computer data storage medium, a data buffer associated with the medium, and an output device for receiving data from the medium and the data buffer, comprising the steps of:
   receiving a request from the output device to transmit read data to the output device;
   receiving write data from the output device for transmitting the write data to the data storage medium;
   transmitting the read data to the output device prior to completely transmitting the write data from the buffer to the data storage medium when the read data is contained in the buffer;

transmitting the write data from the buffer to the data storage medium prior to transmitting the read data from the data storage medium to the output device when the read data is not contained in the buffer;

reading data from the data storage medium into the buffer prior to requests for the data;

writing data from the output device onto a predetermined data track in the storage medium;

determining whether the read ahead means is reading data from the predetermined track; and permitting the read ahead means to continue to read data from the data storage medium when the data being read is contained in the predetermined track.

9. The method of claim 8, further comprising the step of:

causing the read ahead means to terminate reading data into the buffer and then causing the write means to write data from the output device onto the predetermined data track in the storage medium when the read ahead means is reading data from other than the predetermined track.

10. A system for managing data transfer between a computer data storage medium, a data buffer associated with the medium, and an output device for receiving data from the medium and the data buffer, comprising:

read ahead means for reading data from the data storage medium into the buffer prior to requests for the data;

write means for writing data from the output device onto a predetermined data track in the storage medium;

determining means for determining whether the read ahead means is reading a data from the predetermined track; and continuing means responsive to the determining means for permitting the read ahead means to continue to read data from the data storage medium when the data being read is contained in the predetermined track.

11. The system of claim 10, further comprising preempting means for causing the read ahead means to terminate reading data into the buffer and for causing the write means to write data from the output device onto the predetermined data track in the storage medium when the read ahead means is reading data from other than the predetermined track.

12. The system of claim 11, wherein the write means writes data onto the predetermined data track in a predetermined sector of the storage medium, and the preempting means causes the read ahead means to terminate reading data into the buffer causes the write means to write data from the output device onto the predetermined data track when the predetermined sector is juxtaposed with the write means.

13. The system of claim 12, further comprising:

a read receiver for receiving a request from the output device to transmit read data to the output device;

a write receiver associated with the data buffer for receiving write data from the output device and for transmitting the write data to the data storage medium; and a switch for selectively transmitting the read data to the output device prior to transmitting the write data from the buffer to the data storage medium based upon whether the read data is contained in the buffer.

14. The system of claim 13, wherein the switch transmits the read data to the output device prior to transmitting the write data to the data storage medium when the read data is contained in the buffer.

15. A system for managing data transfer, comprising:

a computer including a data storage medium, a data buffer associated with the medium, and an output device for receiving data from the medium and the data buffer;

read ahead means for reading data from the data storage medium into the buffer prior to requests for the data;

write means for writing data from the output device onto a predetermined data track in the storage medium;

determining means for determining whether the read ahead means is reading data from the predetermined track; and continuing means responsive to the determining means for permitting the read ahead means to continue to read data from the data storage medium when the data being read is contained in the predetermined track.

16. The system of claim 15, further comprising preempting means for causing the read ahead means to terminate reading data into the buffer and for causing the write means to write data onto the predetermined data track in the storage medium when the read ahead means is reading data from other than the predetermined track.

17. The system of claim 16, wherein the write means writes data onto the predetermined data track in a predetermined sector of the storage medium, and the preempting means causes the read ahead means to terminate reading data into the buffer and causes the write means to write data onto the predetermined data track when the predetermined sector is juxtaposed with the write means.

18. The system of claim 17, further comprising:

a read receiver for receiving a request from the output device to transmit read data to the output device;

a write receive associated with the data buffer for receiving write data from the output device and for transmitting the write data to the data storage medium; and a switch for selectively transmitting the read data to the output device prior to transmitting the write data from the buffer to the data storage medium based upon whether the read data is contained in the buffer.

19. The system of claim 18, wherein the switch transmits the read data to the output device prior to transmitting the write data to the data storage medium when the read data is contained in the buffer.

20. A method for managing data transfer between a computer data storage medium, a data buffer associated with the medium, and an output device for receiving data from the medium and the data buffer, comprising the steps of:

(a) reading data from the data storage medium into the buffer prior to requests for the data;

(b) receiving a request to write data from the output device onto a predetermined data track in the storage medium;

(c) determining whether the data being read ahead is on the predetermined track; and (d) continuing to read data from the data storage medium when the data being read is contained in the predetermined track.

21. The method of claim 20, further comprising the step of;

(e) terminating reading data into the buffer and then writing data from the output device onto the predetermined data track in the storage medium when the data being read is from other than the predetermined tack.

22. The method of claim 21, further comprising the steps of:

(f) receiving a request from the output device to transmit read data to the output device;

(g) receiving write data from the output device for transmitting the write data to the data storage medium; and (h) transmitting the read data to the output device prior to completely transmitting the write data from the buffer to the data storage medium when the read data is contained in the buffer.

* * * * *